(12) United States Patent
Laari et al.

(10) Patent No.: US 11,375,434 B2
(45) Date of Patent: Jun. 28, 2022

(54) METHOD AND MESH NODE FOR ENABLING COMMUNICATION IN A WIRELESS MESH NETWORK

(71) Applicant: Telefonaktiebolaget LM Ericsson (publ), Stockholm (SE)

(72) Inventors: Petri Laari, Espoo (FI); Jan Melén, Espoo (FI); Jimmy Kjällman, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/052,440

(22) PCT Filed: Jun. 19, 2018

(86) PCT No.: PCT/SE2018/050648
§ 371 (c)(1),
(2) Date: Nov. 2, 2020

(87) PCT Pub. No.: WO2019/245414
PCT Pub. Date: Dec. 26, 2019

(65) Prior Publication Data
US 2021/0176694 A1    Jun. 10, 2021

(51) Int. Cl.
*H04W 40/30* (2009.01)
*H04W 84/18* (2009.01)
*H04W 88/16* (2009.01)

(52) U.S. Cl.
CPC ............ *H04W 40/30* (2013.01); *H04W 84/18* (2013.01); *H04W 88/16* (2013.01)

(58) Field of Classification Search
None
See application file for complete search history.

(56) References Cited

U.S. PATENT DOCUMENTS

2012/0287934 A1    11/2012  Sarela et al.
2019/0306050 A1 *  10/2019  Onishi ................. H04L 67/12

FOREIGN PATENT DOCUMENTS

WO       2016 093749 A1     6/2016
WO    WO-2017039502 A1 *    3/2017   .......... H04W 40/248
WO       2017 188748 A1    11/2017

OTHER PUBLICATIONS

A Survey: Optimal Node Routing Strategies in Manet by Renisha P. Salim and Dr. R. Rajesh—2020.

(Continued)

*Primary Examiner* — Brian S Roberts
(74) *Attorney, Agent, or Firm* — Baker Botts, LLP

(57) ABSTRACT

A method and a mesh node (200) for enabling communication of packets in a wireless mesh network with multiple mesh nodes. When receiving (2:2) an original advertisement message with a Bloom filter initiated by an original gateway (204), it is detected that a predetermined maximum fill rate is reached in the received Bloom filter. The mesh node (200) starts to act as an intermediate gateway and creates a new advertisement message (2:3) comprising a new initiated Bloom filter with a reduced fill rate. The new advertisement message is then transmitted (2:4) with the new Bloom filter while indicating that the new advertisement message originates from said original gateway (204).

21 Claims, 8 Drawing Sheets

(56) References Cited

OTHER PUBLICATIONS

Implementing Zfilter Based Forwarding Node on a Netfpga by Jari Keinanen et al.—2007.
LIPSIN: Line Speed Publish/Subscribe Inter-Networking by Petri Jokela et al.—2009.
Architecture Definition, Components Descriptions and Requirements; Deliverable D2.3; Pursuit, Publish Subscribe Internet Technology FP7-INFSO-ICT-257217—2011.
Scalable Segment Routing—A New Paradigm for Efficient Service Provider Networking Using Carrier Ethernet Advances by Sarvesh Bidkar et al., vol. 7, No. 5, Opt. Commun. Netw. 445—May 2015.
PCT International Search Report issued for International application No. PCT/SE2018/050648—dated Mar. 27, 2019.
PCT Written Opinion of the Internatinoal Searching Authority issued for International application No. PCT/SE2018/050648—dated Mar. 27, 2019.
Extended European Search Report issued for Application No. / Patent No. 18923104.6-1215 / 3811678 PCT/SE2018/050648—dated Dec. 15, 2021.
State-Efficient Forwarding With In-Packet Bloom Filters, Department of Communications and Networking by Petri Laari; Aalto University publication series, Doctoral Dissertations—2017.

* cited by examiner

METHOD AND MESH NODE FOR ENABLING COMMUNICATION IN A WIRELESS MESH NETWORK

PRIORITY

This nonprovisional application is a U.S. National Stage Filing under 35 U.S.C. § 371 of International Patent Application Serial No. PCT/SE2018/050648 filed Jun. 19, 2018 and entitled "Method and Mesh Node for Enabling Communication in a Wireless Mesh Network" which is hereby incorporated by reference in its entirety.

TECHNICAL FIELD

The present disclosure relates generally to a method and a mesh node, for enabling communication of packets in a wireless mesh network with multiple mesh nodes.

BACKGROUND

Recently, techniques have been developed for communication of packets in a wireless mesh network which comprises a multitude of mesh nodes. To enable communication with entities outside the mesh network, e.g. located in a public network such as the Internet, the mesh network is connected to one or more gateways which provide connectivity to any outside networks and entities. For example, a mesh network may be comprised of so-called Internet of Things, IoT, devices which are mostly very simple autonomous devices capable of wireless communication, at least over short distances. The term "wireless mesh network" is used herein to denote such a network of wireless communication devices and nodes, called "mesh nodes" herein. It should also be noted that the terms transmit and send are used interchangeably and as synonyms throughout this disclosure.

Wireless IoT devices are typically required to operate over long periods with lowest possible power consumption without having to charge or replace their batteries, which is one reason they often need to have a very limited communication range. Sensor networks are one type of IoT networks, where the sensors and middle routers are forming the network by connecting to each other. The connection technology for such IoT devices can be wireless which enables communication across a wireless IoT network without requiring a wired infrastructure. Wireless networks are thus easier to physically setup, but the packet routing in the network is not as trivial as with wired connections since each wireless transmission from a mesh node can be received by more than one other mesh node.

In order to communicate with entities outside the wireless mesh network, a mesh node therein needs to send packets across a gateway, which may require forwarding across a number of intermediate mesh nodes, or "hops", before the gateway is reached. It has been suggested that forwarding based on so-called Bloom filters can be employed in a wireless mesh network comprising low power devices such as IoT devices. The Bloom filter defined for a mesh node effectively describes a path between that mesh node and a gateway which may be comprised of a considerable number of hops, given the limited range of the mesh nodes.

In order to find and define the closest path with a minimum of hops between each mesh node and the gateway, the gateway sends out an advertisement message which is forwarded between the mesh nodes while a Bloom filter comprised in the advertisement message is built up to indicate that path. In more detail, the Bloom filter can be built up by adding each mesh node's "forwarding indicator" in the Bloom filter, which is an identifier that, when matching a received packet at the node, instructs the node to forward the packet to the next node in the path. Thus, the path is identified in the Bloom filter by the forwarding indicators that actually define the path from the respective mesh node to the gateway. The Bloom filter of a received advertisement message is stored in each mesh node as a "collector Bloom filter", so that the filter can be used as a basis for a forwarding decision for any packet to be transmitted and forwarded by that mesh node towards the gateway, commonly referred to as an "in-packet Bloom filter", iBF.

In the Bloom filter, the wireless links between mesh nodes in the path may be identified so that a mesh node having received and stored its Bloom filter from an advertisement message, can read the Bloom filter in a received packet and compare it with its own stored collector Bloom filter where the reverse path to the gateway is collected, to make a forwarding decision for the packet. Thereby, any other mesh node that receives the packet can retransmit it in the same manner, and the packet will be forwarded from node to node along the path according to their stored collector Bloom filters until the packet finally reaches the gateway.

An example of how a collector Bloom filter can be built up in a wireless mesh network will now be described with reference to FIG. 1 which illustrates a simplified wireless mesh network 100 with mesh nodes A-E which are able to communicate with the Internet over a gateway GW. In reality, a wireless mesh network comprises a much larger number of mesh nodes, sometimes with hundreds or even thousands of nodes. The circles around the nodes schematically indicate their radio range.

The gateway transmits an advertisement message with a collector Bloom filter which is empty in the sense that there are no links or mesh nodes specified yet and a Time To Live, TTL, parameter therein is set to zero. The TTL in an advertisement message has the purpose of indicating the number of hops in the path the advertisement message has taken (so far). The transmitted advertisement message is received at least by mesh node A which is within radio range from the gateway. The mesh node A then modifies the Bloom filter in the message, basically by adding the above-mentioned forwarding indicator and incrementing the TTL parameter by one to indicate one hop so far, and transmits the advertisement message with the new collector Bloom filter.

This time, the advertisement message is received by mesh nodes B and D which are both within radio range from the mesh node A. Mesh nodes B and D then likewise modify the collector Bloom filter in the received message, basically by adding their forwarding indicators and incrementing the TTL parameter by one so that TTL=2 to indicate two hops from the gateway, and both B and D transmit the advertisement message with their respective collector Bloom filters included. The advertisement message from node B is received by mesh node C while the advertisement message from node D is received by mesh node E.

As a result, node E will add its own forwarding indicator to the collector Bloom filter and increment the TTL parameter by one so that TTL=3, and transmit the advertisement message with the new Bloom filter which is received by mesh node C which has already received the advertisement message from node B where the TTL=2. Since the mesh node C finds that the TTL=3 in the Bloom filter from E is higher than the TTL=2 in the Bloom filter from B, mesh node C will discard and not forward the advertisement message from node E with the higher TTL. Thereby, mesh node C will save the Bloom filter with the shortest path GW-A-B-C and not save the Bloom filter with a longer path GW-A-D-E-C.

It should be noted that the advertisement message transmitted by node D or node B will also be received by node A being within radio range, but since node A has already saved a collector Bloom filter with TTL=1, i.e. the one received from the gateway, the advertisement messages from node D and node B will be discarded and not forwarded by A since they have collector Bloom filters with larger TTL=2. This way, the advertisement message will not be bounced back and forth between any two mesh nodes and the TTL parameter makes sure that the collector Bloom filter that describes the shortest path to the gateway will be saved and forwarded while any other received Bloom filter will be discarded.

The mesh network may be changed from time to time, e.g. when mesh nodes are added or removed, or when one or more mesh nodes change their position. As a result, the collector Bloom filters saved by the mesh nodes may become outdated, e.g. by defining a path with a mesh node that no longer exists, or by not defining the closest path anymore. The gateway may therefore transmit advertisement messages several times, e.g. at prescribed intervals or upon demand, so that the mesh nodes can update or renew their collector Bloom filters in the above manner.

As mentioned above, there may be many mesh nodes in a wireless mesh network and the nodes that are located "far away" from the gateway in terms of hops will need a Bloom filter that identifies a great number of nodes and hops in the path from the gateway. However, even though there is technically no limit to the number of items that can be accommodated in a Bloom filter it is a problem that the Bloom filter would need to have a large size, i.e. number of bits, to accommodate all these mesh nodes in the path with reasonable low risk of false positive matches that would generate additional traffic in the network, which imposes great load on the network since much radio resources are required to transmit an advertisement message or a packet with such a large Bloom filter. In some networks, e.g. Bluetooth, the packet size limits the size of the Bloom filter, which restricts even more the amount of information that can be added. Also, much power will be consumed for transmissions from the mesh nodes which is a problem particularly for low power nodes. A limitation to the Bloom filter size may therefore sometimes be implemented which may result in that some far away node(s) will not be reachable from the gateway since the Bloom filter cannot accommodate all mesh nodes in its path to the gateway.

Thus it is a problem with In-packet Bloom filters that when the Bloom filter is filled too much, e.g. when over 50% of the bits therein are set to one, the probability for false positives also increases rapidly. This has been solved in a typical implementation by allowing a maximum fill rate of e.g. 50%, such that if there are more than 50% of bits set to one in the Bloom filter of a packet, the packet is not forwarded. This limits the number of hops (links) that can be added to the forwarded Bloom filter, but typically 256-bit filters are long enough to cover most of the forwarding cases, although in Bluetooth the Bloom filter may be restricted to merely 40 bits. With mesh networks where the number of nodes is large, e.g. over 1000, the fill rate may need to exceed a 50% limit when the paths become long in the network. This can be solved by increasing the size of the Bloom filter, which however creates problems with the radio technology due to the increased packet size, as explained above.

SUMMARY

It is an object of embodiments described herein to address at least some of the problems and issues outlined above. It is possible to achieve this object and others by using a method and a mesh node as defined in the attached independent claims.

According to one aspect, a method is performed by a mesh node for enabling communication of packets in a wireless mesh network with multiple mesh nodes.

In this method, the mesh node receives an original advertisement message comprising a Bloom filter initiated by an original gateway of the mesh network. The Bloom filter indicates a mesh path for delivering packets from nodes in the wireless mesh network to the original gateway. When detecting that a predetermined maximum fill rate is reached in the Bloom filter of the received original advertisement message, the mesh node creates a new advertisement message comprising a new Bloom filter initiated by the mesh node with a reduced fill rate, thereby acting as an intermediate gateway. The mesh node then transmits the new advertisement message with the new Bloom filter indicating that the new advertisement message originates from said original gateway.

According to another aspect, a mesh node is arranged to enable communication of packets in a wireless mesh network with multiple mesh nodes. The mesh node is configured to receive an original advertisement message comprising a Bloom filter initiated by an original gateway of the mesh network, wherein the Bloom filter indicates a mesh path for delivering packets from nodes in the wireless mesh network to the original gateway. The mesh node is further configured to detect that a predetermined maximum fill rate is reached in the Bloom filter of the received original advertisement message, and to create a new advertisement message comprising a new Bloom filter initiated by the mesh node with a reduced fill rate, such that the mesh node will thereby act as an intermediate gateway. The mesh node is also configured to transmit the new advertisement message with the new Bloom filter indicating that the new advertisement message originates from said original gateway.

The above method and mesh node may be configured and implemented according to different optional embodiments to accomplish further features and benefits, to be described below.

A computer program is also provided comprising instructions which, when executed on at least one computer in the above mesh node, cause the at least one computer to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to avoid the need for large Bloom filters by letting a mesh node act as an intermediate gateway when detecting that the Bloom filter in a received original advertisement message has a fill rate that exceeds a certain threshold or maximum value. When forwarding the advertisement message, the mesh node stores the received Bloom filter and initiates a new Bloom filter with a much reduced fill rate which is transmitted in a new advertisement message to indicate that it is an intermediate gateway. Thereby, there is room in the new Bloom filter for further hop information as the new advertisement message propagates towards mesh nodes further away from the original gateway that has sent the original advertisement message. When receiving a packet with the new Bloom filter from such a further away mesh node, the present mesh node acting as an intermediate gateway towards any further away mesh nodes replaces the Bloom filter in the packet with the previously stored Bloom filter towards the original gateway and forwards the packet accordingly, thereby acting as an ordinary mesh node towards the original gateway.

Figure 1:
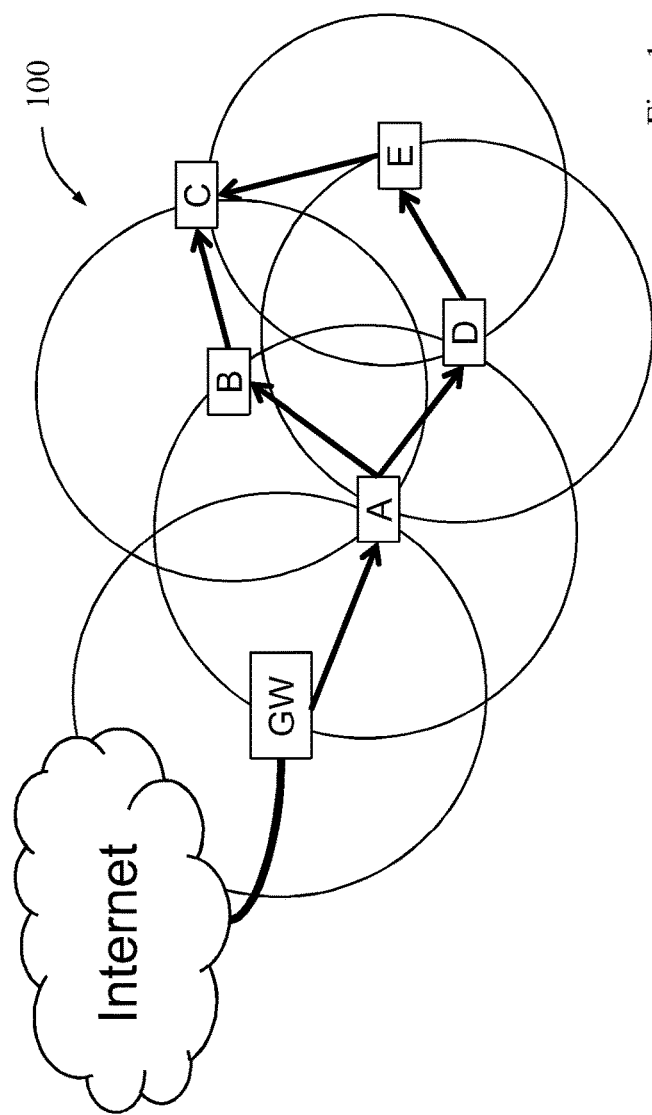
FIG. 1 is a communication scenario illustrating propagation of an advertisement message across a wireless mesh network, according to the prior art.
Figure 2:
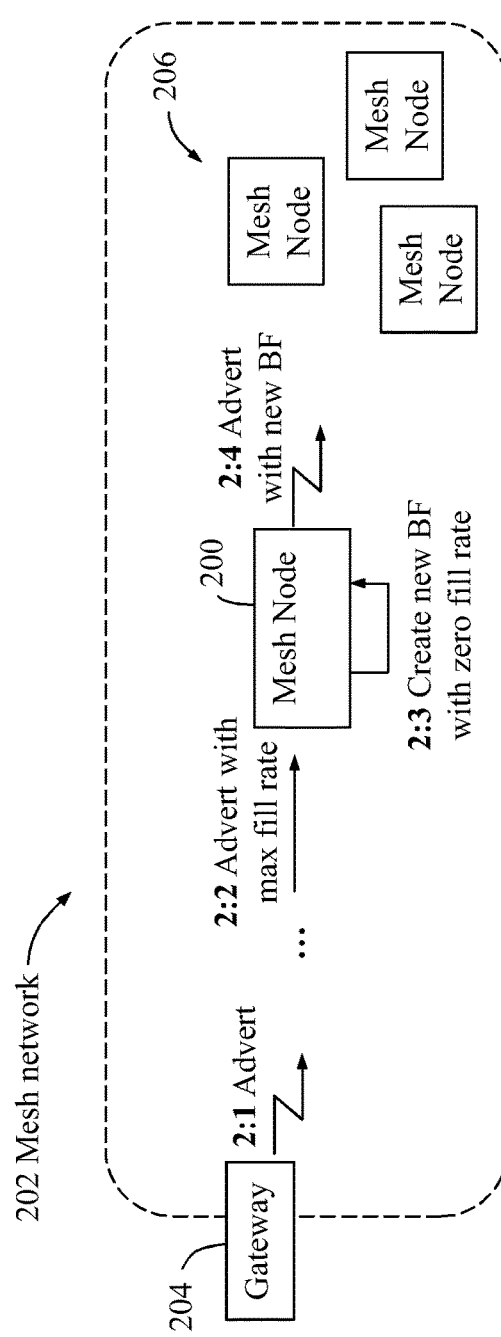
FIG. 2 is a communication scenario illustrating a simplified example of how the solution may be employed, according to some example embodiments.

FIG. 2 is a simplified illustration of how the above solution could be employed in a mesh node 200 of a wireless mesh network 202 for communication with an original gateway 204 that provides connectivity to other networks such as the Internet, not shown. For communication of packets and messages with the gateway 204, the mesh node 200 is capable of acting as an intermediate gateway towards other mesh nodes 206 which are located further away from the original gateway 204 than the mesh node 200.

A first action 2:1 illustrates that the original gateway 204 transmits an original advertisement message "Advert" which is forwarded across the network in multiple hops over various mesh nodes, not shown. A collector Bloom filter in the advertisement message is gradually filled with information that indicates a closest hop path back to the original gateway 204 thus indicating each hop in the path in the regular manner described above. After a certain number of hops, the collector Bloom filter reaches a predefined maximum allowed fill rate, e.g. 50% of set bits in the Bloom filter, which means that the message cannot be forwarded further. It was mentioned above that such a maximum fill rate may be defined so as to limit the probability for false positives which is a basic Bloom filter property. When a packet is verified against a stored collector Bloom filter, the risk for false matching becomes greater with increased number of hops indicated in the Bloom filter, which can be statistically calculated.

The original advertisement message with maximum fill rate of its collector Bloom filter is received by the mesh node 200 in an action 2:2, and accordingly the mesh node 200 detects that the prescribed maximum fill rate is reached in the Bloom filter of the received original advertisement message. The mesh node 200 then starts to act as an intermediate gateway and creates a new advertisement message in a following action 2:3, and includes a new collector Bloom filter therein which is initiated by the mesh node 200 with a reduced fill rate. The mesh node 200 finally sends out the new advertisement message with the new initiated Bloom filter, in a following action 2:4. It is indicated in the new collector Bloom filter of the new advertisement message that the new advertisement message originates from the original gateway 204.

As a result, the new advertisement message is able to propagate over further mesh nodes since the initiated new collector Bloom filter has room for more hop information that can be added to the new Bloom filter as the new advertisement message propagates over further mesh nodes. This means that the total path back to the original gateway 204 can be extended with more hops than what could be accommodated in the collector Bloom filter of the original advertisement message which had thus reached the maximum fill rate when arriving in the mesh node 200. Initiating the Bloom filter means basically that most of the bits therein are set to zero, thus reducing the fill rate considerably. The new Bloom filter thus contains initially an indicator that maps to the original Bloom filter which will be used to forward any future packets coming from the mesh nodes 206 towards the original gateway 204. Thus, there is one "entry" in the new Bloom filter in the new advertisement message transmitted from the mesh node 200 acting as intermediate gateway, so that the mesh node 200 knows when the Bloom filter in an incoming packet needs to be replaced.

A problem has thus been recognized with In-packet Bloom filters in large networks where the packet delivery paths are long, that the iBF is filled too much (e.g. over 50% of bits is set to one), so that the probability for false positives increases rapidly. This could be solved by using e.g. maximum fill rate set to 50%, i.e. if there are more than 50% of bits set to one, the packet is not forwarded. However, this limits the number of hops (links) that can be added to the forwarding iBF, although typically used 256-bit filters should be long enough to cover most of the forwarding cases.

With mesh networks, where the number of mesh nodes is large, e.g. over 1000, the fill rate may exceed the 50% limit when the paths become long in the network. This can be solved by increasing the size of the iBF, e.g. from 128 bits to 256 bits or even more. However, this creates problems with the radio technology, as the sizes of the packets increases.

The above intermediate Gateway (iGW) can thus be used for reducing the iBF fill rate. When a node receiving a Gateway advertisement message, notices that the iBF collector field that is used to deliver packets from the mesh network nodes to the Gateway is exceeding the determined maximum fill rate, e.g. 50%, it starts to act as an iGW.

When the iGW is in operation, it initiates a gateway advertisement from itself notifying the receivers that it is acting as an intermediate gateway towards the original gateway. The advertisement message contains also an identity of the original GW, thus when a mesh node receives such an iGW advertisement, it verifies whether it has a direct forwarding information to the GW or not, and if it does not exist, it starts using the iGW as the GW and forwards the iGW advertisement further. If it has already direct forwarding information to the original Gateway, it drops the iGW advertisement.

Figure 3:
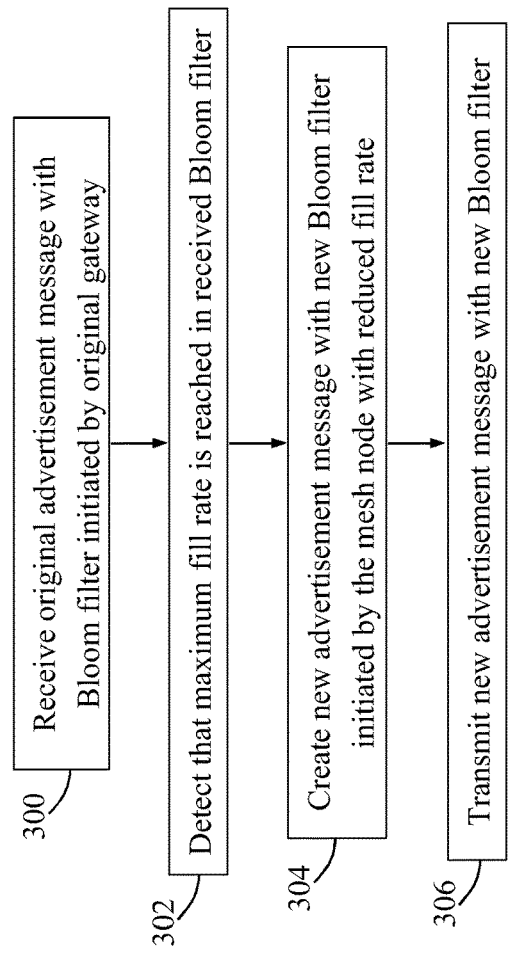
FIG. 3 is a flow chart illustrating a procedure in a mesh node, according to further example embodiments.

An example of how the solution may be employed in terms of actions performed by a mesh node such as the mesh node 200, is illustrated by the flow chart in FIG. 3, which will now be described with further reference to FIG. 2 although the procedure in FIG. 3 is not limited to the scenario in FIG. 2. The actions in FIG. 3 are thus performed by the mesh node 200 for enabling communication of packets in a wireless mesh network 202 with multiple mesh nodes.

A first action 300 illustrates that the mesh node 200 receives an original advertisement message comprising a Bloom filter initiated by an original gateway 204 of the mesh network. The Bloom filter indicates a mesh path for delivering packets from nodes in the wireless mesh network to the original gateway 204. It is assumed that when the original advertisement message arrives at the mesh node 200, the mesh path it has travelled so far includes so many hops and mesh nodes so that the original Bloom filter therein has reached a predetermined maximum fill rate, which fill rate has thus been increased each time the advertisement message is forwarded and makes a hop.

In a next action 302, the mesh node 200 accordingly detects that a predetermined maximum fill rate is reached in the Bloom filter of the received original advertisement message, which means that no further hop information can be added to the Bloom filter, e.g. because the risk for false positives could increase rapidly to an unacceptable or unwanted level. In response thereto, the mesh node 200 creates a new advertisement message comprising a new Bloom filter initiated by the mesh node with a reduced fill rate, in a further action 304, thereby acting as an intermediate gateway. Finally, the mesh node 200 transmits the new advertisement message with the new Bloom filter indicating that the new advertisement message originates from said original gateway.

Advantages that may be achieved when using the above procedure include that the fill rate in the network can be reduced to any desired value which just adds some iGW nodes in the network. This keeps the fill rates low, thus improving the Forwarding Efficiency overall in the network. In addition, in some cases the fill rate limitation may leave some nodes not reachable. With iGWs we can easily extend the coverage Some examples of embodiments that may be employed in the above procedure in FIG. 3 will now be described, likewise with further reference to FIG. 2. In one example embodiment, the received Bloom filter is stored in the mesh node 200 when acting as an intermediate gateway, to enable forwarding of packets from the mesh node to the original gateway according to the stored Bloom filter. This means that when a packet is received from a further away mesh node 206, the mesh node 200 will replace the Bloom filter in the received packet with the stored Bloom filter which is used to forward the packet towards the original gateway 204.

In another example embodiment, the new advertisement message includes a Time To Live, TTL, value that equals a TTL value in the received original advertisement message increased by one. It was mentioned above that the TTL in an advertisement message indicates the number of hops in the path the advertisement message has taken from the original gateway since it is incremented by one at each hop away from the gateway. When a packet is sent in the opposite direction, the TTL is reduced by one at each hop. Thereby, the TTL value set at each mesh node indicates the total number of hops in the path to the original gateway 204. Some examples of how the TTL parameter is handled will be described later below.

Alternatively, the mesh node 200 may instead set the TTL value to zero in the transmitted new advertisement message. When a data packet later arrives from one of the nodes 206, the mesh node 200 would in that case both replace the Bloom filter as described above and set the new TTL value to the TTL value that the mesh node 200 stored with the original Bloom filter received from the gateway 204. As a result, the packet would have a lower TTL value "outside" the mesh node 200, thus minimizing the risk for too long paths caused by false positives.

In another example embodiment, the new advertisement message further includes an "identity indicator value" that equals an identity indicator value in the received original advertisement message reduced by one mod n, where n is the number of available node identities in each mesh node. The identity indicator value is often referred to as the "d-value" and it is basically an index that indicates one of a set of available identities of the mesh node 200. Throughout this disclosure, the term identity indicator value could be replaced by "identity index" or similar. If n is large, the risk for false positives is low, and vice versa, since different values of the identity indicator will differentiate multiple receptions of the same packet from different mesh nodes so that the receiving mesh node can discard any packet with an identity indicator value different than in the stored bloom filter. The identity indicator value could alternatively just be set to zero in the new advertisement message, and in that case the original value in the received message is stored as well along with the original Bloom filter, to be restored when packets are forwarded.

In another example embodiment, an identifier identifying the mesh node 200 acting as an intermediate gateway is included in the new Bloom filter, which identifier can be used to map an incoming packet to a Bloom filter leading to the original gateway 204 at the mesh node 200. This will ensure that a packet sent from a further away mesh node 206 containing its stored Bloom filter with said identifier will be forwarded towards the intermediate gateway, i.e. the mesh node 200, and at that node the identifier is used to find the correct Bloom filter to be used when the packet is transmitted further towards the original gateway. In this case, another example embodiment may be that said identifier of the mesh node 200 acting as an intermediate gateway is included as an initial value in a collector field in the new advertisement message so that the mesh node 200 can map the identifier to the stored Bloom filter leading to the original gateway 204.

In another example embodiment, said identifier of the mesh node 200 acting as an intermediate gateway may be a new Link Identifier, denoted $FEId_{GW}$, of the intermediate gateway. Further, another example embodiment may be that the mesh node 200 associates the new Link Identifier $FEId_{GW}$ with the Bloom filter in the original advertisement message. Thereby, the mesh node 200 can deduce that it shall act as an intermediate gateway for a received packet with a Bloom filter containing the new Link Identifier FEId$_{GW}$.

In another example embodiment, the predetermined maximum fill rate may be indicated in the received original advertisement message, which was thus originally sent by the original gateway 204. Thereby, the original gateway 204 is basically able to control how far the original advertisement message will propagate before the Bloom filter will be initialised by a mesh node acting as an intermediate gateway. A larger maximum fill rate may allow for a greater number of hops between the original gateway 204 and the intermediate gateway, and vice versa.

In another example embodiment, when a packet is received with a Bloom filter that contains the identifier of the mesh node 200 acting as an intermediate gateway, the packet is transmitted by the mesh node 200 with the Bloom filter initiated by the original gateway. This embodiment thus refers to how packets are forwarded from an intermediate gateway, in this case mesh node 200, towards the original gateway, and the intermediate gateway should check whether the Bloom filter field, which in this case is used for routing, contains the identifier FEId$_{GW}$, and if it does, transmit the packet with the corresponding stored original Bloom filter.

Figure 4:
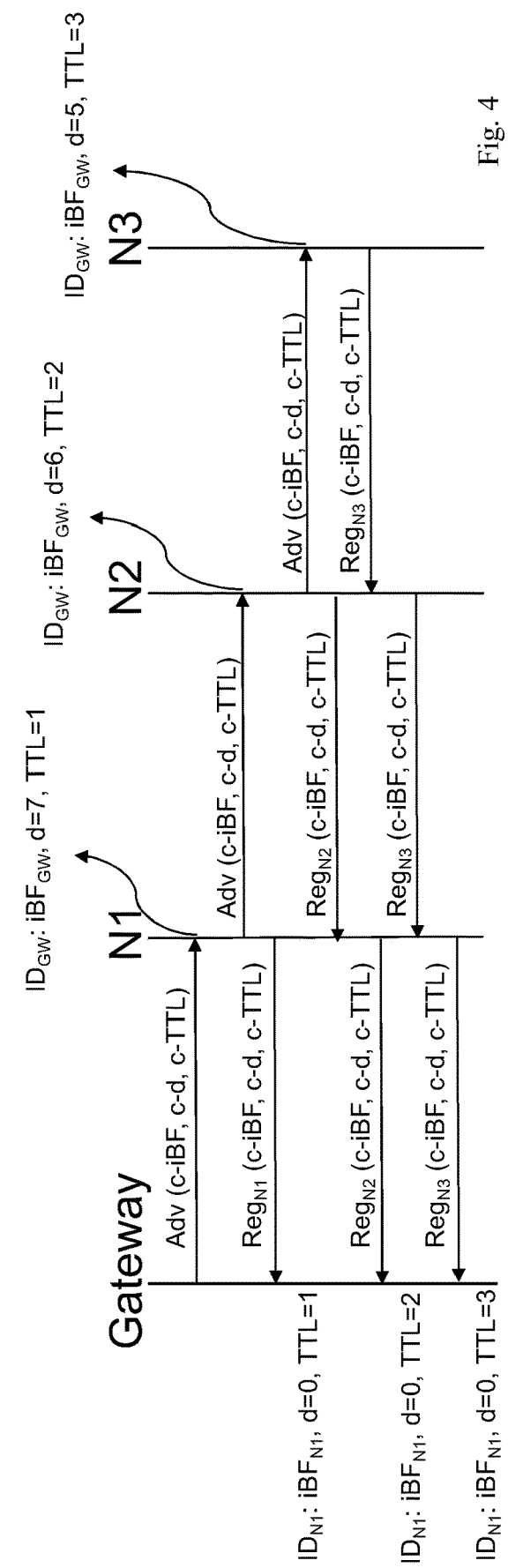
FIG. 4 is a signaling diagram illustrating an example of how an advertisement message and resulting registrations are communicated in a wireless mesh network according to regular procedures.

A regular process of communicating an advertisement message and resulting registrations is schematically illustrated in FIG. 4 which employs the mechanisms of Bloom filter based forwarding in general, involving a gateway and three exemplary mesh nodes N1, N2 and N3. In reality, there are typically a much larger number of mesh nodes that can communicate an advertisement message and registrations in this manner and this figure is a simplified example illustrating some regular mechanisms in a wireless mesh network.

Figure 5A:
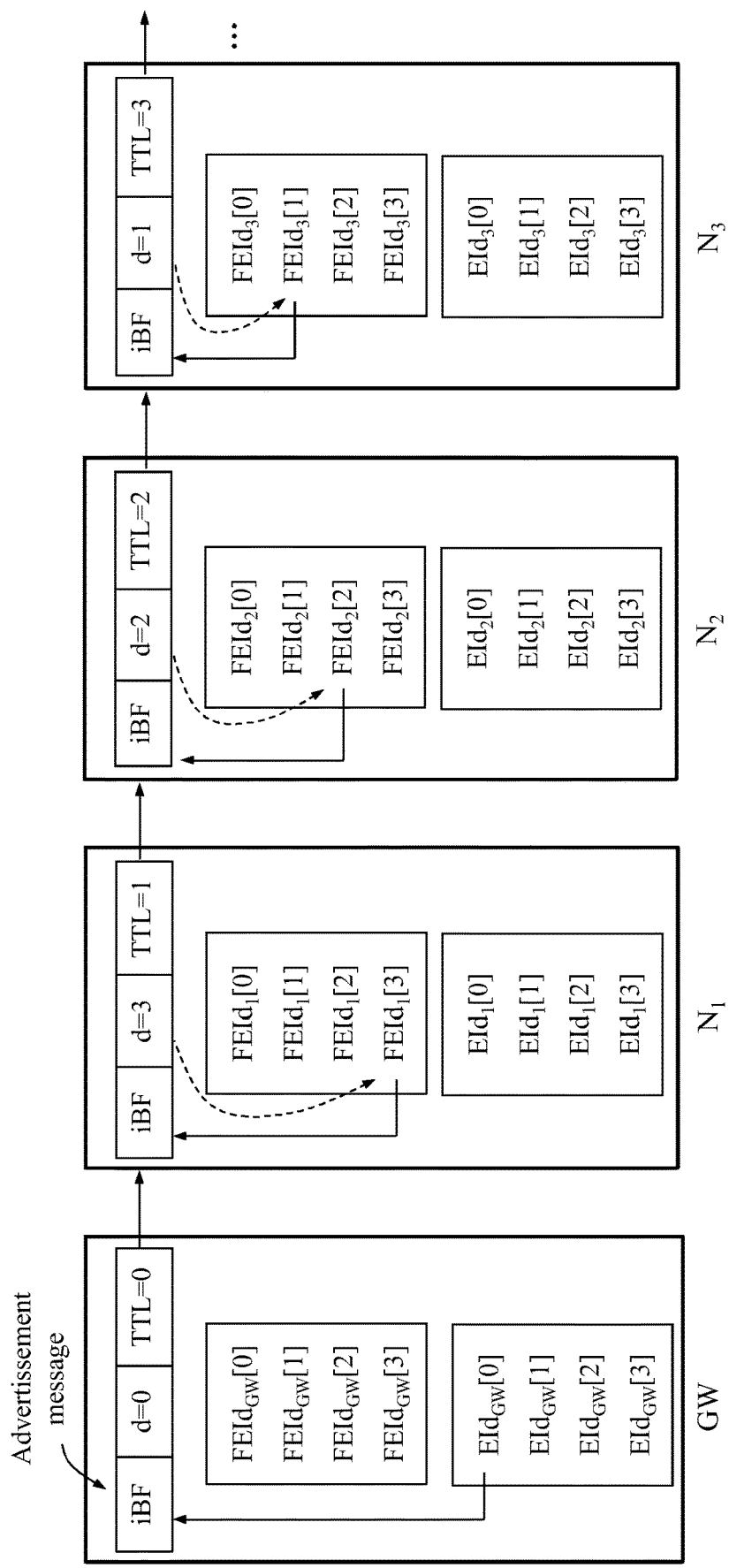
FIG. 5A is a diagram illustrating how an advertisement message is communicated from an original gateway GW, according to regular procedures.

It will now be described in more detail how an advertisement message is communicated from a gateway GW across three exemplary mesh nodes $N_1$, $N_2$ and $N_3$, using regular procedures in a wireless mesh network as shown in FIG. 5A. The advertisement message contains three fields: a collected Bloom filter field "iBF", a collected d field "c-d", and a collected Time To Live field "c-TTL". The d-field comprises the above-mentioned identity indicator value which is reduced by one at each hop of the advertisement message. The c-TTL indicates how many entries have been inserted in the collected Bloom filter, i.e. how long the path is to the sender of the advertisement message which is thus the gateway GW.

It is assumed that each node has n=4 Forwarding Entity Identifiers denoted "FEId" for making forwarding decisions, and n=4 End-point Identifiers denoted "EId" that are used to direct an incoming packet for local processing. The Gateway GW initiates the advertisement procedure by creating the Advertisement message.

In the collected d (c-d) field it inserts zero and it sets the iBF collecting field (c-iBF) to one of its own identities EId$_{GW}$[0], as indicated by an arrow in GW. This Advertisement message is used to collect and build up the iBF to be added by each node to a transmitted packet, which finally leads to processing the packet at the gateway GW. The collected TTL (c-TTL) field is also initially set to zero by gateway GW.

Before sending out the Advertisement message (broadcasted in a packet), the c-d–field is decreased by one (mod n) and the c-TTL field is increased by one. The advertisement message also comprises a sequence number which is increased each time a new advertisement is transmitted by the gateway GW. When the advertisement message is received by a mesh node $N_1$-$N_3$, it performs the following operations 1-5:

1) Check if the mesh node has already stored an iBF with a sequence number and forwarding information towards the GW from where the advertisement was sent. If yes, check if the sequence number in the received advertisement is greater than the one it has already stored from a previously received advertisement message. If this is not the case, the received advertisement message is dropped by the mesh node. If the sequence number is greater, it means that this is a new advertisement message that has not been received before and should therefore be processed and forwarded.

2) If the iBF in the received advertisement message needs to be stored, a Gateway identity in the advertisement message is associated with the iBF received in the c-iBF field in the advertisement message, together with the c-d and c-TTL values. Also the sequence number of the message is stored. This stored iBF can be used to deliver packets from this mesh node to the Gateway GW.

3) Add own identity FEId[c-d] in the c-iBF field by logically OR-ing it with existing content in the c-iBF field. This can also be expressed as: c-iBF (out)=c-iBF (in) OR FEId[c-d], where OR is a well-known bitwise operation. Decrease the c-d field by one (mod n) and increase the c-TTL field by one. Send the packet out so that it can be received by a next mesh node where the procedure is repeated.

4) Create a registration message to be sent to the gateway GW, as also shown in FIG. 4, to indicate the path to the mesh node so that the GW can send packets towards the mesh node according to the registration message. Insert own ID as the sender of the registration message. There is a separate field in the registration message indicating the sender of the registration message. Insert EId with index value n-d, where d is the value received in the c-d field in the incoming advertisement message. Insert the associated TTL value in the TTL field in the message. The c-d field is selected so that the c-d is zero when it reaches the Gateway. This ensures that the registration message has arrived at the Gateway through the correct reverse path and that the Gateway can, if needed, create multicast iBFs to many nodes and use the same d-value in the sent multicast packet.

5) Send the registration message out and first decrease the c-d field by one (mod n).
   Note: this is always done in the same order when forwarding the packet out, which simplifies the implementation, which is why the c-d is originally inserted one greater than what it is in the outgoing message.

The Gateway processes the received Registration messages and stores forwarding information towards the sender of the Registration message, as follows.

Check if there already exists a registration entry for the sending node at the gateway. If yes, update the associated iBF, d, and TTL values from the received registration message. Note that the c-d should be always zero when arriving from the network.

If an entry does not exist already, create a new entry using the identifier of the mesh node, iBF from the collected iBF field, zero as the initial d-value, and TTL from the c-TTL field.

Figure 5B:
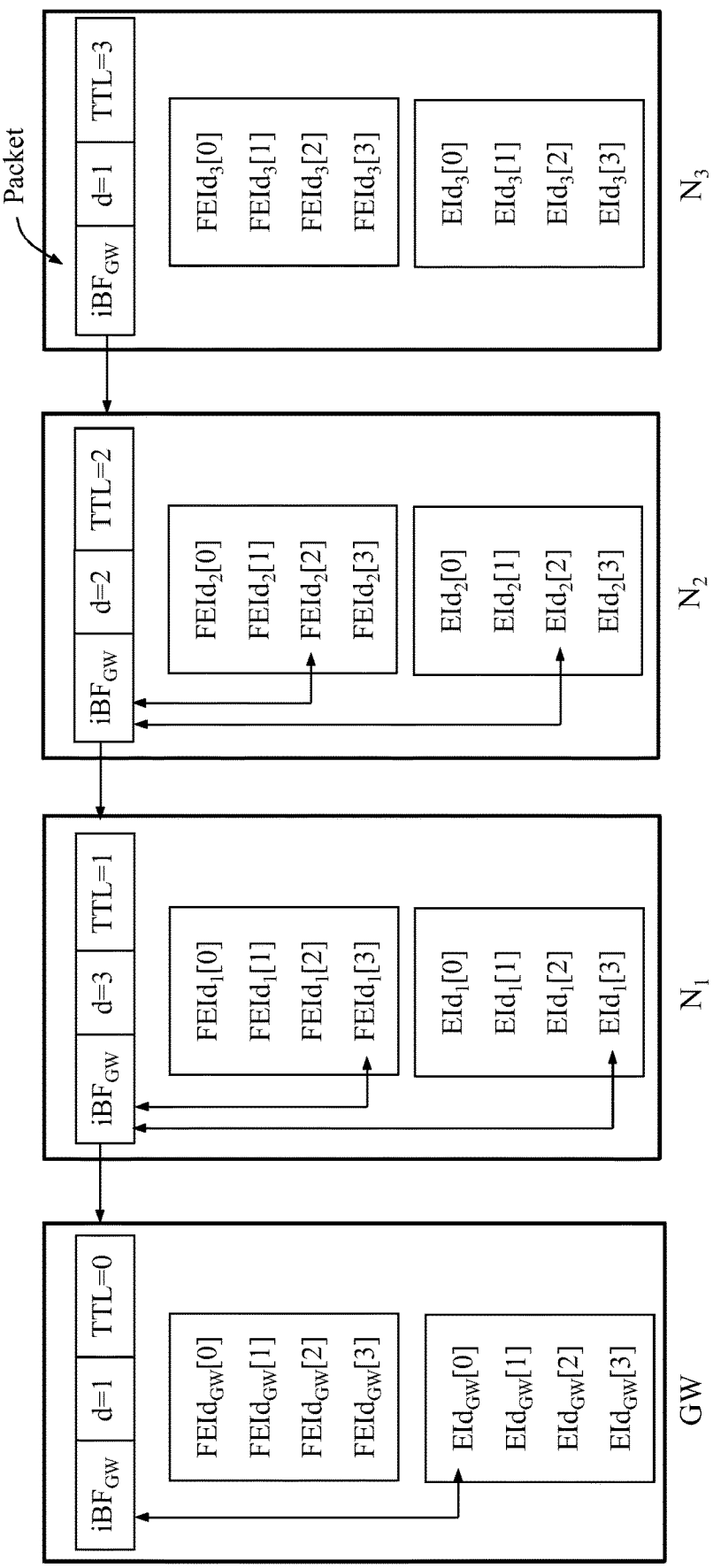
FIG. 5B is a diagram illustrating how a packet is communicated in the opposite direction to the original gateway GW, according to regular procedures.

All packet forwarding, apart from the broadcasted GW Advertisement messages, use forwarding information in the iBF as depicted in FIG. 5B which illustrates how a packet can be forwarded from node N3 to the gateway GW according to regular procedures. Each node $N_2$-$N_1$ receiving the packet checks from the incoming packet the TTL value therein. If the TTL value is zero, the packet is not processed. If more than zero, the TTL value is decreased by one and if it is then zero, the packet is verified only if it is going to local processing at this node by matching the EId[d] with the iBF in the packet. If there is a match, the packet is taken to local processing in the node. If the TTL is still greater than zero after the reduction, the node matches also the FEId[d] with the iBF. If there is a match, the d-field in the packet is increased by one (mod n) and the packet is sent out. If there is no match, the packet is dropped.

During simulations it has been noticed that 50% fill rate provides relatively good results, i.e. the Forwarding Efficiency is high (>95%, meaning that <5% of packets delivered between nodes are subjected to false positives). However, in some scenarios, the paths are so long that the 50% fill rate limit is exceeded during the iBF collecting procedure. If it is decided to drop the Advertisement packet in these cases, there will be nodes that do not receive the Advertisement, and they cannot communicate to the Gateway. This can thus be avoided by using the solution described herein.

FIG. 5B shows packet forwarding when each node has a set of FEIds for forwarding. The node gets the d-value from the received packet and uses that as the index for the FEId as well as for EId to check if the packet is targeted also for itself, and if there is a match, the d-value is increased by one (mod n) and the packet is sent further to the next node. This ensures that if the packet can also be heard by the previous node, this node will not match the same FEId at that node as it would cause the packet to bounce back and forth between the two nodes.

It will now be described how the solution can be used in practice with reference to FIG. 6 again involving a gateway and three exemplary mesh nodes N1, N2 and N3. In this example, the mesh node N2 acts as the above-described intermediate Gateway iGW and the following operations 1-7 may be performed by the involved nodes.

1) The gateway sends an Advertisement message, containing collector field (initially containing only the EId for the GW), c-d (containing zero), c-TTL (initially zero), which is received by N1.
   1a) N1 processes the Advertisement message and stores the GW identifier and related iBF forwarding information (iBF, d, TTL).

Naturally, the c-TTL value is increased and the c-d value is decreased before the Advertisement message is sent out, as also shown in FIG. 5A.

2) N1 forwards the Advertisement message further which is received by N2.
   2a) N2 processes the Advertisement message; it notices that the c-IBF fill rate is too large and it starts to act as an iGW node. It stores the Gateway ID and the related iBF forwarding information. It also creates a new FEId which it uses in following operations.
3) N1 sends a registration message, as in regular procedures, back to the GW.
   3a) The GW stores the iBF to N1 together with the ID of N1.
4) N2 creates a new iGW Advertisement message (that is similar to the normal GW Advertisements), containing the c-iBF (initially set to $FEId_{GW}$), and the c-d and c-TTL values are in this example taken directly from the original GW advertisement message. N2 sends out the new iGW advertisement message which is received by N3.
   4a) N3 processes the Advertisement message as it was a normal GW advertisement. It creates a mapping using the original GW identifier, the iBF collected in the message (which actually leads to the N2), d, and TTL.
5) N2 sends a registration message
   5a) N2→N1
   5b) N1→GW
   5c) GW processes the registration and stores $ID_{N2}$ together with the iBF forwarding information.
6) N3 sends a registration message, which is forwarded to the iGW i.e. N2.
   6a) N2 processes the registration because it has the $FEId_{GW}$ included in the iBF. It creates a new $FEId_{N3}$ and maps it with the iBF that was collected in the Registration message that can be used to deliver the packet to N3.
7) N2 sends the N3 Registration message further, containing the $iBF_{N2 \rightarrow GW}$ as the forwarding information and $FEId_{N3}$ as the initial value in the c-iBF field.
   7a) N2→N1
   7b) N1→GW
   7c) GW processes the registration from $ID_{N3}$ and creates the mapping for $ID_{N3}$ which has the iBF forwarding information that delivers the packet to the GW2.

Figure 7:
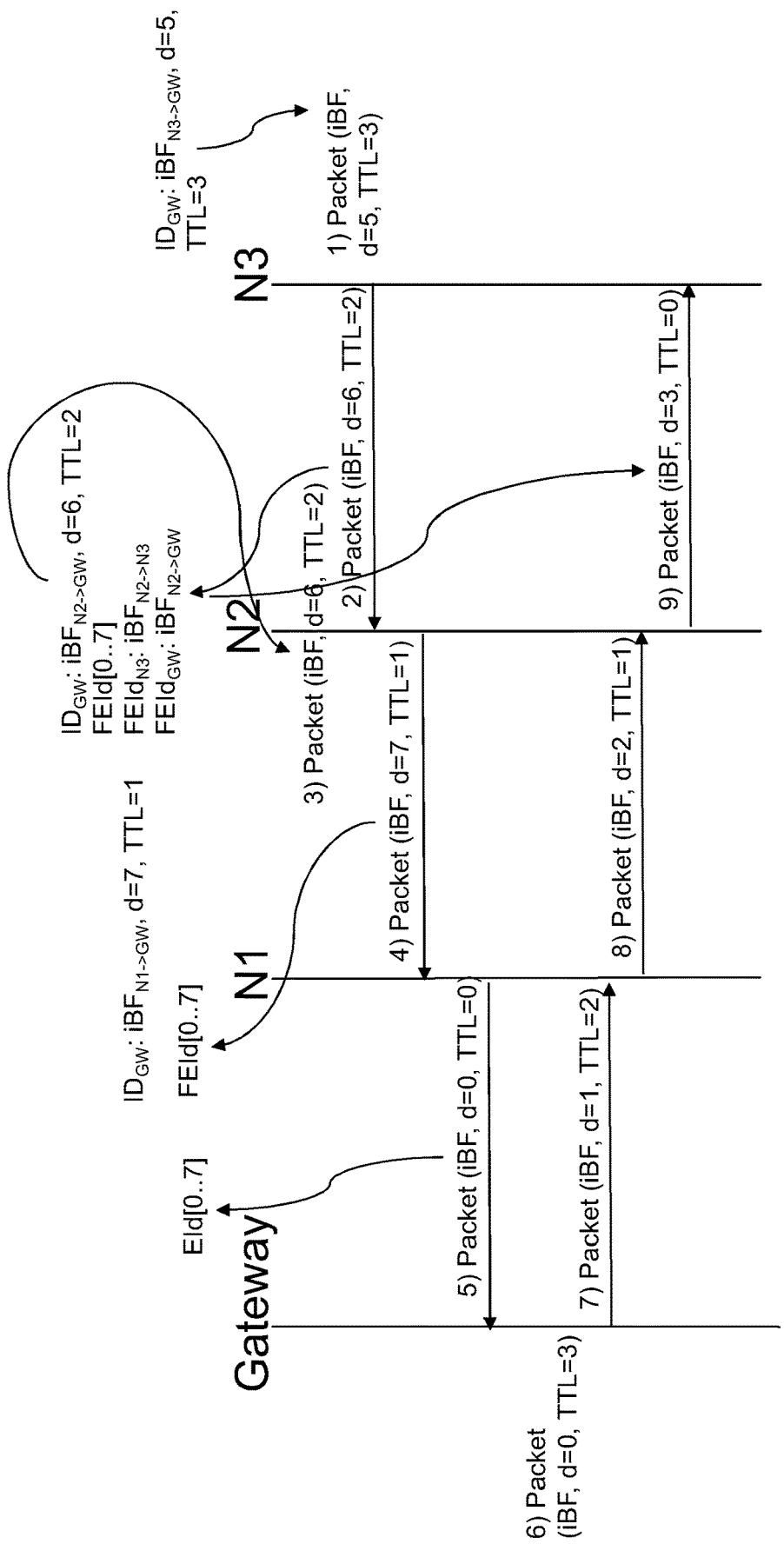
FIG. 7 is a signaling diagram illustrating how packets may be communicated in either direction over the mesh node N2, according to further example embodiments.

Some further examples of how a packet can be forwarded from a node N3 and how a packet can be forwarded from the original Gateway GW, will now be described with reference to FIG. 7 illustrating the following operations 1-5 (packet from N3) and 6-9 (packet from GW), respectively. The node N2 is again acting as intermediate gateway.

1) N3 creates a new packet and sends it to the GW. The iBF towards the GW is included in the forwarding header, together with the related d-value and TTL value which the node $N_3$ has stored from an advertisement message previously received from the GW.
2) $N_3$ sends out the packet, increases the d-value by one, and decreases the TTL value by one.
3) $N_2$ (which is also iGW), verifies that the $FEId_{GW}$ is included in the incoming packet's iBF (note, that it may also verify FEId[6], which does not match). From the stored information, $N_2$ checks the GW mapped to the matching $FEId_{GW}$, retrieves the corresponding stored $iBF_{GW}$ and replaces the original iBF in the packet header with the $iBF_{GW}$ and sends the packet further with TTL=TTL−1 and d=d+1.
4) $N_1$ verifies with iBF and d values if the packet is to be forwarded out from this node, match with FEId[7] and the packet is sent further with TTL=TTL−1 and d=d+1 (mod 8)=0.
5) At the gateway, the iBF matches with the EId[0] and the packet is taken into local processing, e.g. by forwarding the packet further to the Internet.
6) GW creates a packet to be sent to $N_3$, gets $iBF_{GW \rightarrow N3}$ that it has stored from the Registration message from $N_3$, see FIG. 6, operations 7a-c, as well as d=0 (which is necessary if multicast is enabled in the network), and TTL=3.
7) GW sends out the packet with TTL=TTL−1 and d=d+1 (mod 8).
8) $N_1$ verifies the iBF, matches FEId[1] and sends out with TTL=TTL−1 and d=d+1 (mod8)

9) $N_2$ verifies the iBF with FEId[2] (should not match) and also with generated and stored FEIds with the "clients" (i.e. nodes for which it acts as iGW). In this case, the iBF matches $FEId_3$ and the node gets the corresponding stored $iBF_{N2\to N3}$ (see FIG. 6, operations 6 and 6a), replaces the destination iBF with the stored iBF and forwards the packet out, noting that the TTL and d values may remain the same. When $N_3$ receives the packet, TTL=0 indicates that the packet will not be sent out, and the matching is done only between iBF and EId[3] which in this case matches, and the packet is taken into local processing.

Some further examples of how the above embodiments may be employed in practice, will now be described.

When a mesh node notices that the fill rate is too high and will exceed the maximum fill rate, e.g. over 50%, when it adds its own FEId in the field, the node makes itself an intermediate Gateway iGW. Thereby, mesh nodes that are further away from the Gateway do not have to use overly filled iBFs when sending packets, but they use iBFs with reduced fill rate to deliver the packet to the iGW, which in turn is responsible for further delivering the packet to the real Gateway using the original iBF.

When the forwarding mesh node notices that the fill rate is too high, it will thus act as an intermediate gateway and may perform the following operations 1-6:

1) The mesh node creates the $ID_{GW}$ entry as described in the previous section.
2) The mesh node creates a new $FEId_{GW}$, which is used as the indicator that an incoming packet containing it in the iBF is moving towards the Gateway. The iGW associates the $FEId_{GW}$ with the $iBF_{GW}$ that it received in the original Advertisement message from the Gateway (same iBF as in step 1)
3) The mesh node does not forward the original Advertisement further as it is already too full.
4) The mesh node creates a new iGW Advertisement message, where it puts the $FEId_{GW}$ [((original c-d-field)-1)mod n] as the initial value in the collector iBF field. The c-d field in the Advertisement is initialized to the original c-d field-1 mod n. Also the c-TTL from the original Advertisement is increased by one and set to the c-TTL field in the new iGW Advertisement.
5) In addition to the original Advertisement, the iGW Advertisement contains also the ID of the original Gateway, so that receiving nodes can create a mapping towards the real Gateway, they do not need to care that there is an iGW between.
6) The mesh node sends out the new Advertisement message.

When a mesh node receives an iGW Advertisement, it verifies whether it already has an $iBF_{GW}$ received from other nodes or not. If this is the case, the node does not need the iGW for communication, so it can safely drop the Advertisement. If the node does not have any forwarding information towards a GW, it creates one using the information in the iGW Advertisement and sends the Advertisement further according to the following operations 1-3.

1) The node creates a mapping between $ID_{GW}$ (i.e. the real Gateway, not the intermediate Gateway) and the $iBF_{GW}$ from the c-iBF field in the Advertisement. In addition, it gets the c-d and c-TTL fields and associates them with the $ID_{GW}$. This is the information that is needed to deliver packets from this node to the Gateway. See FIG. 6, operation 4: the $iBF_{GW}$ in the collecting field delivers the packet actually to the iGW.
2) In a similar way, as with the normal Advertisement message, the node adds its own FEId[c-d] to the c-iBF field in the iGW Advertisement, adds one to the c-TTL field, decreases the c-d field by one (mod n) and sends out the new iGW Advertisement message.
3) The node sends its Registration message towards the Gateway using the information just stored and associated with the $ID_{GW}$.

When the iGW receives the Registration message, it can process the message according to the following operations 1-3.

1) If there is not yet registration from that particular node, the iGW creates a new $FEId_{ID\text{-}Node}[n]$ for that node. From the registration message, the iGW gets the c-iBF field and associates it with the $FEId_{ID\text{-}Node}$.
2) The Registration packet is going to the gateway, so the iGW changes the forwarding iBF in the packet to the one it has stored and associated with the $ID_{GW}$. The d and TTL values do not need to be replaced, as they are correct ones, because they were maintained already when the Advertisement was previously replaced with the iGW Advertisement.
3) The iGW clears the c-iBF field and sets the $FEId_{ID\text{-}Node}[c\text{-}d]$ in the c-iBF field instead.

Registration handling at the original Gateway may be performed as follows.

Figure 6:
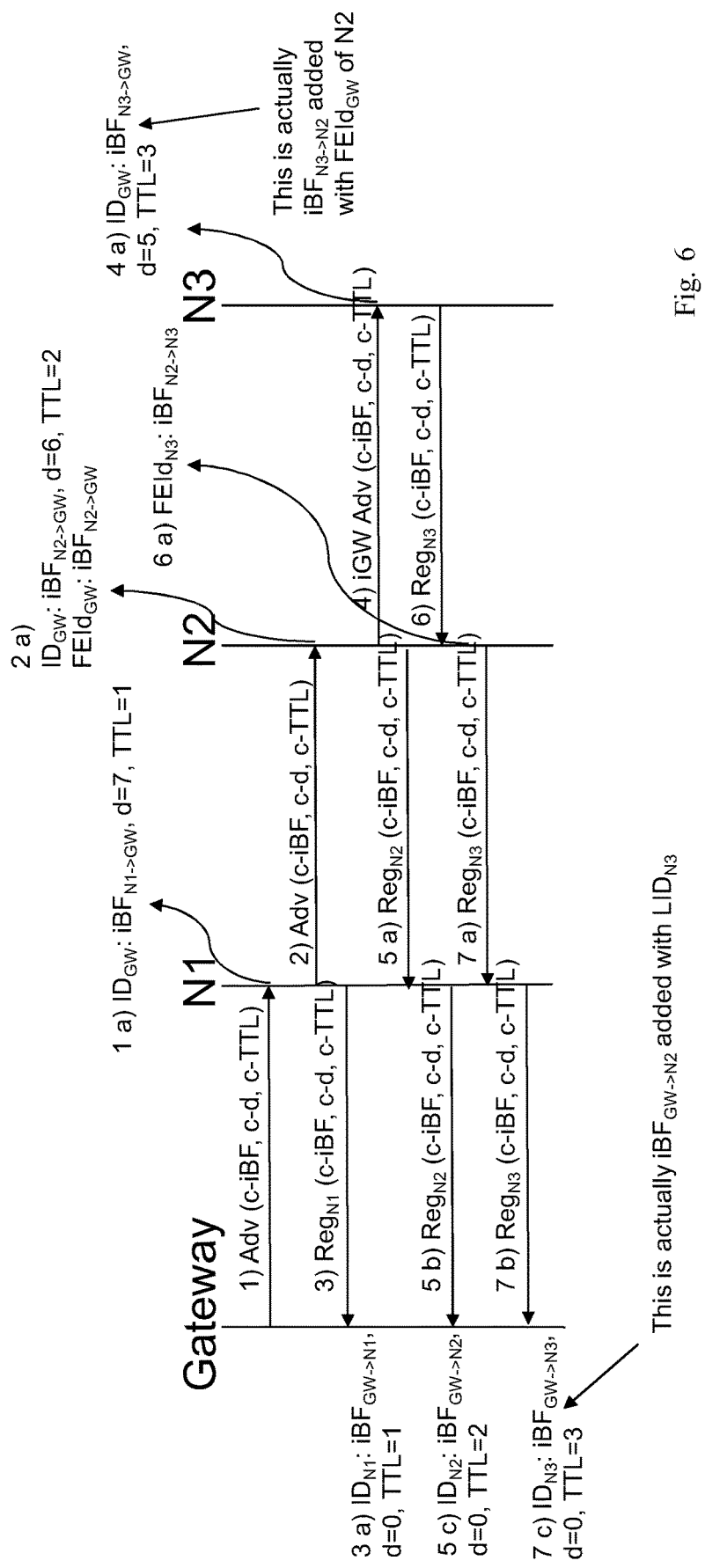
FIG. 6 is a signaling diagram illustrating how an advertisement message and resulting registrations may be communicated when the solution is used in a mesh node N2, according to further example embodiments.

The original Gateway GW receives a Registration message for a node behind an iGW, see FIG. 6, operation 7. The GW stores the required information, but the iBF that it receives from the collector field, delivers any further data packets coming from the GW to an end-node via the iGW to the iGW as it was initialized at the iGW. The GW need not to be aware of the iGW.

Data packet handling may be performed as follows in different scenarios 1-2.

1) Sending a packet from the original GW to a node behind iGW:
   a) The GW creates a data packet and uses the iBF stored for that destination
   b) The packet is delivered to the iGW, where the iBF matches the $FEId_{ID\text{-}node}$ that is further mapped to $iBF_{ID\text{-}node}$. The iGW changes the iBF to the new one, and sends the packet further. Thus, the packet will be delivered to the real destination.
2) Sending a packet from a node behind iGW to the GW:
   a) When the mesh node creates a packet towards the GW, it gets the stored $iBF_{GW}$, together with the d and TTL information and sends it to the network
   b) The packet will arrive to the iGW, where the iBF matches the $FEId_{GW}$. The iGW takes the corresponding stored $iBF_{GW}$, replaces the iBF field in the packet and delivers the packet further. The packet will be forwarded towards the Gateway.

Figure 8:
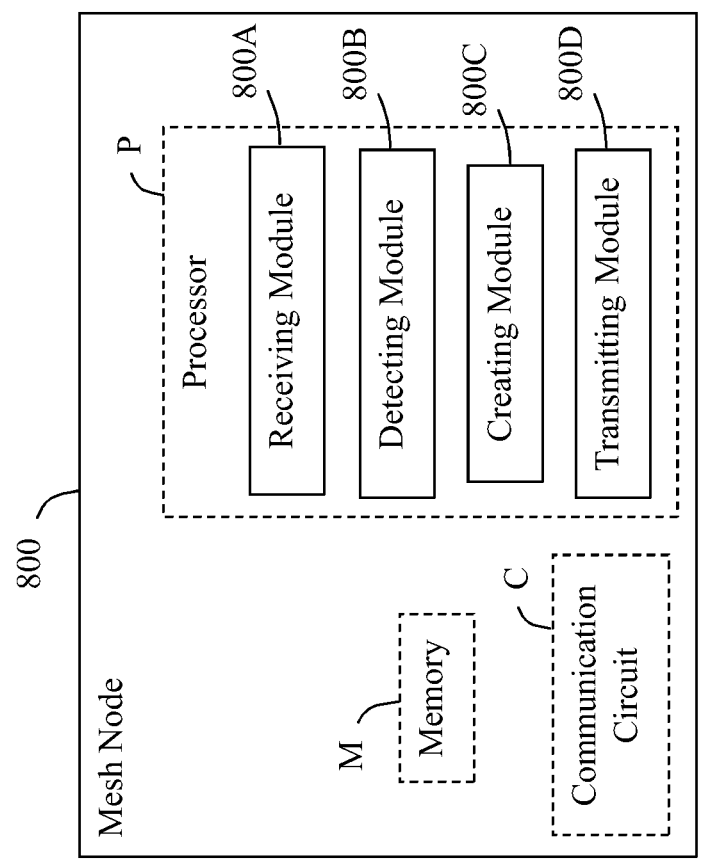
FIG. 8 is a block diagram illustrating how a mesh node may be structured, according to further example embodiments.

The block diagram in FIG. 8 illustrates a detailed but non-limiting example of how a mesh node 800 may be structured to bring about the above-described solution and embodiments thereof. The mesh node 800 may be configured to operate according to any of the examples and embodiments for employing the solution as described herein, where appropriate and as follows. The mesh node 800 is shown to comprise a processor P and a memory M, said memory comprising instructions executable by said processor P whereby the mesh node 800 is operable as described herein. The mesh node 800 also comprises a communication circuit C with suitable equipment for performing transmissions and receiving messages and packets in the manner described herein.

The mesh node 800 corresponds to the mesh node 200 in FIG. 2. The communication circuit C may be configured for communication with mesh nodes located within radio coverage, using suitable protocols and messages. Such communication may be performed over any suitable radio channels depending on the implementation, and the solution and embodiments herein are not limited to using any specific types of messages or protocols for communication.

The mesh node 800 comprises means configured or arranged to basically perform the actions in FIG. 3, and more or less as described above for the mesh node 200 in various examples and embodiments. In FIG. 8, the mesh node 800 is arranged or configured to enable communication of packets in a wireless mesh network with multiple mesh nodes, as follows.

The mesh node 800 is configured to receive an original advertisement message comprising a Bloom filter initiated by an original gateway of the mesh network, wherein the Bloom filter indicates a mesh path for delivering packets from nodes in the wireless mesh network to the original gateway. This operation may be performed by a receiving module 800A in the mesh node 800, e.g. in the manner described above for action 300.

The mesh node 800 is further configured to detect that a predetermined maximum fill rate is reached in the Bloom filter of the received original advertisement message. This operation may be performed by a detecting module 800B in the mesh node 800, e.g. as described above for action 302. The detecting module 800B could alternatively be named a determining module or reading module.

The mesh node 800 is also configured to create a new advertisement message comprising a new Bloom filter initiated by the mesh node with a reduced fill rate, thereby acting as an intermediate gateway. This operation may be performed by a creating module 800C in the mesh node 800, basically as described above for action 304. The creating module 800C could alternatively be named a configuring module or initiating module.

The mesh node 800 is further configured to transmit the new advertisement message with the new Bloom filter indicating that the new advertisement message originates from said original gateway. This operation may be performed by a transmitting module 800D in the mesh node 800, e.g. in the manner described above for action 306. The transmitting module 800D could alternatively be named a sending module or forwarding module.

It should be noted that FIG. 8 illustrates various functional modules or units in the mesh node 800, and the skilled person is able to implement these functional modules in practice using suitable software and hardware. Thus, the solution is generally not limited to the shown structures of the mesh node 800, and the functional modules or units 800A-D therein may be configured to operate according to any of the features and embodiments described in this disclosure, where appropriate.

The functional modules or units 800A-D described above could thus be implemented in the mesh node 800 by means of hardware and program modules of a computer program comprising code means which, when run by the processor P causes the mesh node 800 to perform at least some of the above-described actions and procedures.

In FIG. 8, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the mesh node 800 in the form of a memory having a computer readable medium and being connected to the processor P. The computer program product or memory in the mesh node 800 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the mesh node 800.

The solution described herein may thus be implemented in the mesh node 800 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

An example will now be described with reference to FIG. 9, where multicasting of a packet from a Gateway GW is performed using at least some of the embodiments herein. With iBFs, multicast can be supported by simply logically OR-ing two forwarding iBFs together at the source node. For example, when the Gateway needs to submit the same information to multiple nodes, it can create a multicast iBF by logically OR-ing the unicast iBFs towards the three nodes together into a single multicast iBF. Because the presented solution is designed so that GW sends always packets with d=0, the multicast can be supported this way.

Figure 9:
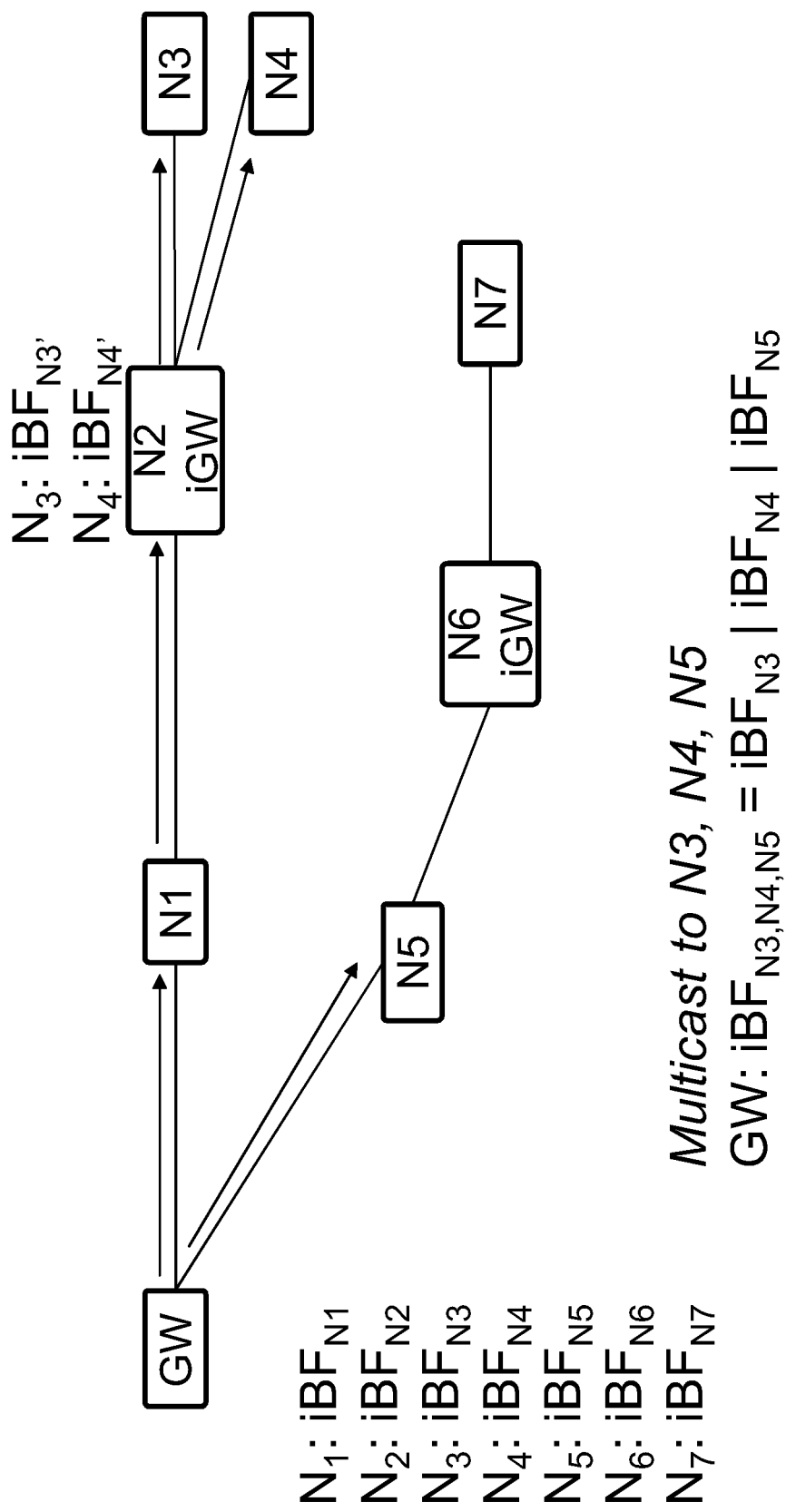
FIG. 9 is another communication scenario illustrating how the solution may be employed for multicasting a packet to several mesh nodes N3, N4, N5, according to further example embodiments.

FIG. 9 thus shows an example of multicast traffic. There it can be seen how the original GW creates the multicast iBF, and also that iGWs in nodes N2 and N6 can further create multicast iBFs if there are several receivers behind it.

FIG. 9 depicts the case when the original GW is sending same multicast traffic to three nodes: N3, N4, and N5. It creates the multicast iBF by logically OR-ing the unique iBFs together. At iGW N2, the iBF is verified, and it will match both N3 and N4 mappings. Thus, the iGW N2 may send the traffic either as unicast traffic, or create a multicast iBF for those two nodes.

While the solution has been described with reference to specific exemplifying embodiments, the description is generally only intended to illustrate the inventive concept and should not be taken as limiting the scope of the solution. For example, the terms "wireless mesh network", "mesh node", "Bloom filter", "advertisement message", "packet" and "intermediate gateway" have been used throughout this disclosure, although any other corresponding entities, functions, and/or parameters could also be used having the features and characteristics described here. The solution is defined by the appended claims.

The invention claimed is:

1. A method performed by a mesh node for enabling communication of packets in a wireless mesh network with multiple mesh nodes, the method comprising:
   receiving an original advertisement message comprising a Bloom filter initiated by an original gateway of the mesh network, wherein the Bloom filter indicates a mesh path for delivering packets from nodes in the wireless mesh network to the original gateway, detecting that a predetermined maximum fill rate is reached in the Bloom filter of the received original advertisement message, creating a new advertisement message comprising a new Bloom filter initiated by the mesh node with a reduced fill rate, thereby acting as an intermediate gateway, and transmitting the new advertisement message with the new Bloom filter indicating that the new advertisement message originates from said original gateway.

2. A method according to claim 1, wherein the received Bloom filter is stored in the mesh node when acting as an intermediate gateway, to enable forwarding of packets from the mesh node to the original gateway according to the stored Bloom filter.

3. A method according to claim 1 wherein the new advertisement message includes a Time To Live, TTL, value that equals a TTL value in the received original advertisement message increased by one.

4. A method according to claim 1, wherein the new advertisement message includes an identity indicator value that equals an identity indicator value in the received original advertisement message reduced by one mod n, where n is the number of available node identities in each mesh node.

5. A method according to claim 1, wherein an identifier identifying the mesh node acting as an intermediate gateway is included in the new Bloom filter.

6. A method according to claim 5, wherein said identifier of the mesh node acting as an intermediate gateway is included as an initial value in a collector field in the new advertisement message.

7. A method according to claim 5 wherein said identifier of the mesh node acting as an intermediate gateway is an Identifier, FEIdGW, of the intermediate gateway.

8. A method according to claim 7, wherein the Identifier of the intermediate gateway FEIdGW is associated with the Bloom filter in the original advertisement message.

9. A method according to claim 5, wherein when a packet is received with a Bloom filter that contains the identifier identifying the mesh node acting as an intermediate gateway, the packet is transmitted with the Bloom filter initiated by the original gateway.

10. A method according to claim 1, wherein the predetermined maximum fill rate is indicated in the received original advertisement message.

11. A computer readable non-transitory storage medium storing a computer program which, when executed on at least one processor, cause the at least one processor to carry out the method according to claim 1.

12. A mesh node arranged to enable communication of packets in a wireless mesh network with multiple mesh nodes, wherein the mesh node comprises a processor configured to:

receive an original advertisement message comprising a Bloom filter initiated by an original gateway of the mesh network, wherein the Bloom filter indicates a mesh path for delivering packets from nodes in the wireless mesh network to the original gateway, detect that a predetermined maximum fill rate is reached in the Bloom filter of the received original advertisement message, create a new advertisement message comprising a new Bloom filter initiated by the mesh node with a reduced fill rate, thereby acting as an intermediate gateway, and transmit the new advertisement message with the new Bloom filter indicating that the new advertisement message originates from said original gateway.

13. A mesh node according to claim 12, wherein the processor is configured to store the received Bloom filter in the mesh node when acting as an intermediate gateway, to enable forwarding of packets from the mesh node to the original gateway according to the stored Bloom filter.

14. A mesh node according to claim 12, wherein the new advertisement message includes a Time To Live, TTL, value that equals a TTL value in the received original advertisement message increased by one.

15. A mesh node according to claim 12, wherein the new advertisement message includes an identity indicator value that equals an identity indicator value in the received original advertisement message reduced by one mod n, where n is the number of available node identities in each mesh node.

16. A mesh node according to claim 12, wherein the processor is configured to include an identifier identifying the mesh node acting as an intermediate gateway in the new Bloom filter.

17. A mesh node according to claim 16, wherein the processor is configured to include said identifier of the mesh node acting as an intermediate gateway as an initial value in a collector field in the new advertisement message.

18. A mesh node according to claim 16, wherein said identifier of the mesh node acting as an intermediate gateway is an Identifier, FEIdGW, of the intermediate gateway.

19. A mesh node according to claim 18, wherein the processor is configured to associate the Identifier of the intermediate gateway FEIdGW with the Bloom filter in the original advertisement message.

20. A mesh node according to claim 16, wherein when a packet is received with a Bloom filter that contains the identifier identifying the mesh node acting as an intermediate gateway, the mesh node is configured to transmit the packet with the Bloom filter initiated by the original gateway.

21. A mesh node according to claim 12, wherein the predetermined maximum fill rate is indicated in the received original advertisement message.

* * * * *